April 9, 1963

M. LÉVECQUE ET AL 3,084,381

PRODUCTION OF FIBERS FROM THERMOPLASTIC
MATERIAL, PARTICULARLY GLASS FIBERS

Filed Jan. 22, 1960

INVENTORS
MARCEL LÉVECQUE
MAURICE CHARPENTIER

BY Albert L. Frey

ATTORNEY

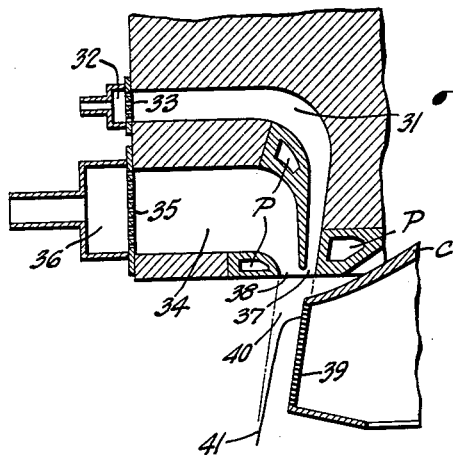
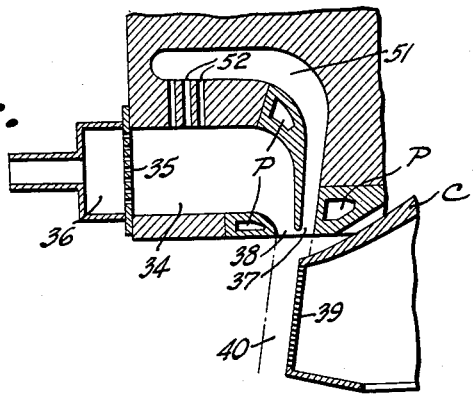
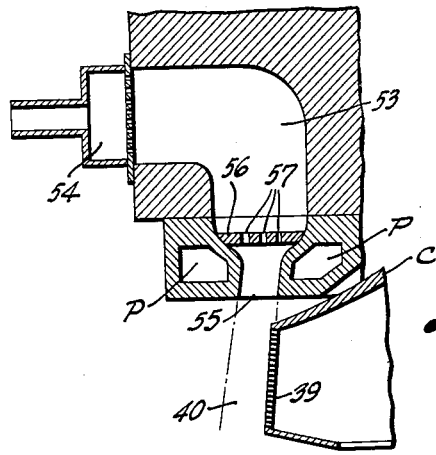

United States Patent Office 3,084,381
Patented Apr. 9, 1963

3,084,381
PRODUCTION OF FIBERS FROM THERMOPLASTIC MATERIAL, PARTICULARLY GLASS FIBERS
Marcel Lévecque, Saint-Gratien, and Maurice Charpentier, Rantigny, France, assignors to Compagnie de Saint-Gobain, Neuilly-sur-Seine, France, a corporation of France
Filed Jan. 22, 1960, Ser. No. 4,143
Claims priority, application France Jan. 27, 1959
5 Claims. (Cl. 18—2.5)

The present invention relates to a process of producing fibers from thermoplastic materials, particularly glass fibers, in which the material in melted state, contained in a hollow rotating body provided with orifices at its periphery, is projected through these orifices in the form of threads through the action of centrifugal force. It is already known that to produce fibers of great fineness, the threads should be subjected to gaseous currents at high speed, in particular gaseous currents resulting from the expansion of gases leaving a combustion chamber. These gaseous currents act on the threads of material by carrying them along and drawing them out into very fine fibers.

To effectuate the process, the centrifuge body may have one or several rows of projection orifices in its peripheral wall or band. In order to attain efficient industrial production, it is desirable to increase as much as possible the number of rows of projection orifices, which, of course, tends to increase the height of the peripheral wall of the centrifuge. When the number of these rows is considerable, for example, above twenty, various difficulties are encountered in obtaining fibers of good quality. It is particularly difficult to maintain, because of the induction of cold exterior gases, temperatures of gas sufficiently high to obtain a re-heating of the glass projected from the orifices in the lower rows, the pencils or cones of glass priming these threads being then too cold to allow attenuation under favorable conditions.

An object of the invention is the improvement which allows fibers of good quality to be obtained whatever may be the number of rows of projection orifices, that is, regardless of the height of the peripheral band of the hollow rotating body, by decreasing or suppressing the fall in temperature of the gases along the length of the band. Thus, the peripheral wall is maintained at a substantially constant temperature over its entire height, which is due to the fact that the gaseous current which circulates in contact with it and which is designed to maintain the pencils of glass at the suitable temperature, does not undergo any noticeable fall in temperature, since it is isolated from the surrounding atmosphere by the exterior part of the same gaseous current or by a separate gaseous current in enveloping relation thereto.

This improvement consists in surrounding the gaseous currents traversing the length of the peripheral band, and assuring the attenuation of the threads of material, with one or several hot exterior gaseous currents or flames in such a way that the drawing-out gaseous current preserves a practically uniform temperature during its entire contact with the band.

The hot exterior gaseous current or currents may have the same composition as that of the drawing-out gaseous currents, or different compositions. They may likewise have the same or different temperature and the same or different velocity.

The gaseous currents traversing the length of the band and assuring the drawing-out procedure may issue from or through the expansion orifice of gases resulting from combustion effected previously in a combustion chamber, and these gaseous currents are surrounded by other currents, which prevent the induction of currents of air or gas from the outside, which may change the temperatures of the drawing-out gaseous currents.

According to one method of attaining the invention, there is placed at the outside of the expansion orifice or orifices of an annular combustion chamber arranged coaxially with the rotating centrifuge, organs fed by combustible and comburent which produce aerated flames which are directed toward the gas currents escaping from the expansion orifice or orifices, or which are parallel to said gas currents, the flames being induced by these currents.

According to another method of operation of the invention, a second combustion chamber is joined to the first combustion chamber. The orifices of this second chamber discharge in the immediate vicinity and at the outside of the expansion orifice or orifices of the first combustion chamber. Such an arrangement permits separate regulation or control of the two concentric jets as regards velocity and temperature, by acting, for example, on the adjustment of the comburent-combustible ratio. Thus, the exterior jet may be regulated by combustion reduction, allowing combustion to be obtained along its entire course, all the while maintaining an oxidizing atmosphere in contact with the band, and a well-defined temperature in the zone where the fibers are formed.

The second combustion chamber may be supplied by means of gases withdrawn from the principal combustion chamber. In this way a gradient of velocities between the outside periphery of the gaseous jets and the band may be realized very simply by decreasing perceptibly the induction of cold gases.

The expansion orifices of the two combustion chambers may be identical, blend into one, or remain separated, and their directions may be parallel or make an angle. These expansion orifices may be in the same or different planes.

The instant invention also contemplates the projection over the entire height of the peripheral wall or band of the hollow rotating body and over its entire lateral surface, a heterogeneous hot gaseous jet the velocity of which on the exterior part is higher than that of the part of the jet which is adjacent to the peripheral wall.

Particularly interesting results accrue from this arrangement. Due to the increase in speed of the heterogeneous gas current in proportion to the increase of distance from the peripheral wall, the threads which escape from the projection orifices are subjected to progressive drawing-out, which leads to obtaining fibers of very good quality.

To attain the last-mentioned objectives, featuring a higher velocity gaseous current surrounding an inner one of lower velocity, the heterogeneous gaseous current is produced by two combustion chambers coaxial with the rotating body, each provided with an expansion orifice likewise coaxial with the rotating body, the gaseous current escaping from the orifice nearest the rotating body having a lower speed than that which escapes from the most remote orifice. These gaseous currents may have the same or different composition and/or the same or different temperature.

According to one embodiment, the two combustion chambers may communicate with each other, the combustion chamber producing the gaseous current of lower speed thus being able to be supplied with a comburent-combustible mixture from the chamber producing the higher speed gaseous current.

According to another method of operation, a single combustion chamber with expansion orifices of different section is utilized.

Several embodiments of the invention for realizing the advantageous results enumerated above are illustrated in the accompanying drawings, wherein FIG. 1 is a vertical sectional view of the left end of a rotary centrifuge with the overlying combustion chamber for directing a blast of hot gaseous current transversely to the fibers issuing from the centrifuge to effect the attenuation thereof and which includes an arrangement for providing a protective screen of flames or hot gases surrounding the blast along the entire length of the peripheral wall of the centrifuge;

Figure 2:
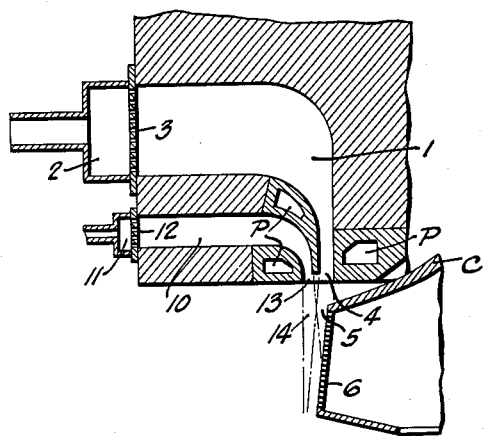
FIG. 2 is a vertical sectional view of an assembly similar to that shown in FIG. 1 featuring an annular blast of combustion gases surrounded by a second annular screen of combustion gases issuing from a pair of merging annular expansion orifices.
Figure 4:
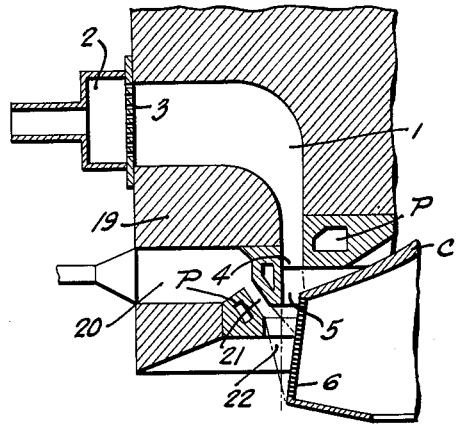

FIG. 4 is a vertical sectional view of still a different embodiment of the invention featuring a downward extension of the combustion chamber presenting a physical obstacle against the entry of cooling currents to the upper part of the peripheral wall, and wherefrom the surrounding protective blast is directed towards the lower part of the peripheral wall of the centrifuge across which sweeps the attenuating blast;

FIG. 5 is a vertical sectional view showing an arrangement similar to that shown in FIG. 2 for producing a heterogeneous blast of combustion gases sweeping the entire height of the peripheral wall of the centrifuge with the velocity of the blast on the exterior higher than that on the interior to prevent the induction of cooling current to the portion of the blast adjacent to the peripheral wall;

FIG. 6 illustrates a different embodiment from that shown in FIG. 5 featuring a common supply of comburent and combustible mixture; and FIG. 7 is a vertical sectional view similar to FIGS. 5 and 6, illustrating a single combustion chamber embodying a device for deriving a heterogeneous blast evidencing different velocities at different radial sections thereof.

In the several embodiments of the invention illustrated in the drawings, it has been assumed that the gas current traversing the length of the peripheral wall of the rotating body and securing the attenuation of the projected threads into fibers, is obtained by means of a combustion chamber 1 preceded by a mixing chamber 2 of combustible and comburent, with which it communicates through grating 3. This combustion chamber is annular and its orifice 4, which may be a continuous slot or orifices placed close together is arranged in the usual manner so that the gaseous current 5 at high temperature which escapes from it travels across the band 6 of the rotating body C for the entire height of this body. As is well known in the art, molten thermoplastic material is projected against the inner face of the peripheral wall 6 by a centrifugal distributor or analogous device, wherefrom the material is projected in the form of threads from the plurality of orifices in the wall.

Figure 1:
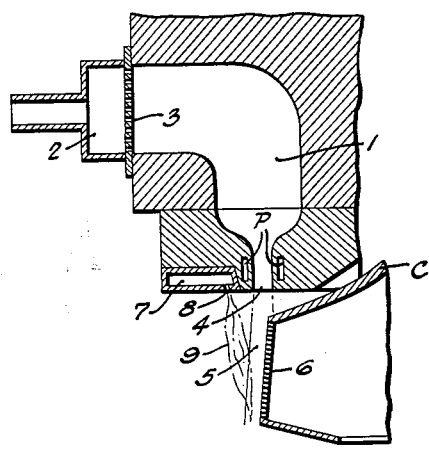

In the embodiment of the invention shown in FIG. 1, there is provided coaxially to the combustion chamber 1, a burner 7 producing at its outlet 8 aerated flames 9 which envelope the gaseous current 5 issuing from the combustion chamber 1. Orifice 8 of the burner, consisting of a continuous slot or a series of holes, may be at the same level as orifice 4 of the combustion chamber or may be set higher. It may be upright or inclined in such a way as to produce flames whose direction from the axis, upon leaving the burner, is parallel to that of the hot gases coming out of orifice 4, or turned toward the current of these hot gases.

In the form of the invention shown in FIG. 2, in addition to elements 1, 2 and 3, as shown in FIG. 1, an auxiliary combustion chamber 10 with a mixing chamber 11, and grating 12 is attached to combustion chamber 1, with outlet 13 therefrom in the vicinity of outlet orifice 4 of the combustion chamber 1. Thus, there is obtained at the outlet of the two orifices 4 and 13, a substantially unitary slot or orifice at their lower extremities. A jet of gas 14 may issue from this unitary orifice which is not homogeneous in composition velocity and temperature with blast 5 by virtue of the fact that rates of flow and ratios of air and gas may be regulated separately in the two chambers 1 and 10.

Figure 3:
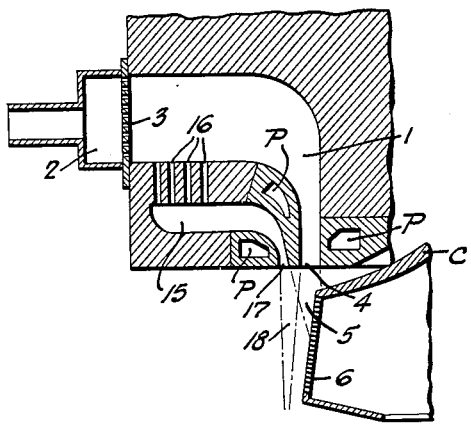
FIG. 3 is a vertical sectional view of an arrangement illustrating a modification of the assembly shown in FIG. 2, with a common source of combustible mixture for the inner and outer blasts of hot gases which issue from concentrically arranged expansion orifices.

In the embodiment illustrated in FIG. 3, an auxiliary combustion chamber 15 is used, which is supplied with comburent-combustible mixture through channels 16 connected between chamber 15 and main combustion chamber 1, which is fed with air and gas from mixing chamber 2 through screen 3. The exhaust of hot gases from chamber 15 takes place through an orifice 17 located at a certain distance from orifice 4 of the combustion chamber 1. These hot gases 18 surround the hot gases 5 and are induced by them. Orifice 17 may be located at the same level as orifice 4, as shown, or at a lower level.

In the embodiment shown in FIG. 4, the body of combustion chamber 1 is extended toward the base by a part 19 concentric with the rotating body. In this part 19, an auxiliary combustion chamber 20 is provided with an outlet orifice 21, through which flow hot gases 22. This orifice is inclined in such a way as to direct hot gases 22 toward the peripheral wall 6 of the rotating body, and in enveloping relation to the blast of hot gases 5 issuing from expansion orifice 4 of combustion chamber 1. Thereby there is provided on a predetermined height of the peripheral wall a material obstacle which opposes the induction of induced air, and in the lower part of the band the induction of induced cold air is prevented by the presence of the hot gaseous current 22.

It is advantageous, as shown in the drawings, to make the lips of the slots or orifices of metallic pieces which allow a circulation of refrigerating fluid through the passages P therein.

FIGS. 5 to 7 illustrate embodiments of the invention which produce a heterogeneous hot gaseous blast in which the gaseous velocity at the exterior part is higher than the velocity of the blast adjacent to the peripheral wall of the centrifuge.

In the embodiment shown in FIG. 5, the device according to the invention comprises two separate combustion chambers. One combustion chamber 31 communicates through a grid 32 with a chamber 33 of a mixture of combustible and comburent, and a combustion chamber 34 communicates through a grid 35 with a mixing chamber 36 for combustible and comburent. These two chambers are annular in form and each is provided with an expansion orifice, 37, 38, respectively, coaxial with rotating centrifuge C having the peripheral wall 39 with a plurality of superposed rows of orifices therein. As is well known these expansion orifices may be either continuous or formed by a succession of slots or holes.

This device produces, at the outlet of orifices 37 and 38 a heterogeneous gaseous current 40 which traverses the length of the peripheral wall 39 of the rotating body over its entire height. This gaseous current 40 evidences a lower velocity in the part adjacent to the wall 39 than that at its exterior part. The speed of the gaseous current in the latter part is such as to effect the attenuation into fibers of the threads of material which have been projected through the orifices in the wall 39 and which have crossed the region of the gaseous current near the peripheral wall. Such a thread drawn out into a fiber is shown by 41.

In the embodiment shown in FIG. 6, the combustion chamber 51 is not autonomous or independent; it receives the combustible-comburent mixture from combustion chamber 34 with which it communicates by means of openings 52. The combustion chamber 34 receives the comburent-combustible mixture from mixing chamber 36 through grid 35. The gaseous blast 40 issuing from orifices 37 and 38 is similar to that described in conjunction with FIG. 5.

In the embodiment shown in FIG. 7, the device according to the invention consists of a single combustion chamber 53 supplied by a combustible-comburent mixture from a mixture chamber 54. Combustion chamber 53 comprises, above its outlet orifices 55, a wall 56 in which are provided openings 57 the cross-section of which increase from the central part toward the exterior part. Thus, at the outlet a heterogeneous gaseous current 40 is obtained, the speed of which is higher at the periphery than in the zone near the wall of the rotating body C.

It is advantageous to make the lips of the expansion orifices of metal, to provide for a circulation of cooling liquid through passages P. This is shown in the embodiments illustrated in FIGS. 5 to 7, as is the case with the embodiments illustrated in FIGS. 1 to 4.

We claim:
1. The method of producing fibers from heated viscous thermoplastic material, which comprises projecting the heated viscous material by centrifugal force from the peripheral wall of a rapidly rotating body having a plurality of superposed rows of orifices therein through which the viscous material issues in filamentary form, directing an annular attenuating blast of hot combustion gases transversely to planes of emission of the fibers to entrain therein the fibers issuing from the rows of orifices, and enveloping said blast with an annular protective screen of hot flames or gases to prevent access of cooling air to said annular attenuating blast to maintain a substantially uniform temperature along the entire height of said peripheral wall, said annular attenuating blast of hot combustion gases and surrounding screen of protective gases being parts of a heterogeneous blast having a varying velocity at different radial portions thereof, with a lower velocity adjacent to the peripheral wall of the centrifuge and a higher velocity outwardly therefrom.

2. An apparatus for producing fibers from thermoplastic material comprising a centrifuge having a peripheral wall provided with a plurality of rows of orifices for discharging the material therethrough by centrifugal force, a combustion chamber adjacent to and surrounding said peripheral wall and provided with an outlet opening for directing hot attenuating combustion gases across the entire height of said peripheral wall to draw out the fibers issuing therefrom, and means for surrounding said hot combustion gases with an additional annular curtain of heated gases or flames closely adjacent to said first-mentioned combustion gases to shield said combustion gases from cooling by the induction of external air to maintain a substantially uniform temperature along the entire height of said peripheral wall at the points of exit of said fibers, said last-mentioned means comprising an annular plate within said combustion chamber above said outlet opening and provided with radially graded apertures increasing in cross-section from the interior to the exterior to permit the additional heated gases on the exterior to acquire a higher velocity than the hot combustion gas adjacent to said peripheral wall.

3. The method of producing fibers from heated viscous thermoplastic material, which comprises projecting the heated viscous material by centrifugal force from the peripheral wall of a rapidly rotating body having a plurality of rows of orifices therein through which the viscous material issues in filamentary form, directing hot attenuating combustion gases transversely to planes of emission of the fibers to entrain therein the fibers issuing from the rows of orifices, and shielding said last-mentioned combustion gases with a heated annular fluid stream of higher velocity than the latter and in substantially parallel surrounding relation thereto, to prevent the induction of external air and thereby to maintain a substantially uniform temperature along the entire height of said peripheral wall at the point of exit of said fibers.

4. The method of producing fibers as set forth in claim 1, including the steps of independently regulating the separate portions of the heterogeneous blast in respect to temperature and composition.

5. An apparatus for producing fibers from thermoplastic material comprising a centrifuge rotating on a vertical axis and having a peripheral wall provided with a plurality of superposed rows of orifices for discharging the material therethrough by centrifugal force, a combustion chamber above said centrifuge provided with an annularly shaped outlet opening for discharging hot attenuating combustion gases from said chamber across said peripheral wall to draw out the fibers issuing therefrom, a second combustion chamber provided with an orifice associated with said outlet opening to produce an annular heated gaseous stream closely surrounding said combustion gases and extending substantially parallel thereto to prevent access of any cooling air to the attenuating combustion gases in the course of their attenuating action on the fibers issuing from all the orifices in the peripheral wall, said orifice of the second combustion chamber merging with the outlet opening of the first combustion chamber to discharge a heterogeneous blast of hot combustion gases from said combustion chambers, and means in said chambers for imparting a higher velocity to the outer boundary of said heterogeneous blast than that imparted to the inner boundary thereof.

References Cited in the file of this patent

UNITED STATES PATENTS

| | | |
|---|---|---|
| 2,499,218 | Hess | Feb. 28, 1950 |
| 2,569,699 | Stalego | Oct. 2, 1951 |
| 2,578,101 | Stalego | Dec. 11, 1951 |
| 2,624,912 | Heymes et al. | Jan. 13, 1953 |
| 3,012,281 | Stalego | Dec. 12, 1961 |

FOREIGN PATENTS

| | | |
|---|---|---|
| 202,877 | Australia | May 3, 1956 |
| 1,124,487 | France | Oct. 11, 1956 |
| 794,319 | Great Britain | Apr. 30, 1958 |
| 1,169,357 | France | Sept. 8, 1958 |
| 565,567 | Belgium | Sept. 10, 1958 |